United States Patent
McGregor et al.

(10) Patent No.: US 10,589,324 B2
(45) Date of Patent: Mar. 17, 2020

(54) CLEANING OF PROCESS EQUIPMENT

(75) Inventors: Craig McGregor, Sasolburg (ZA);
Umesh Ramdhani, Sandton (ZA);
Kevin Blann, Alberton (ZA); Michael Joseph Zogg, Jr., Houston, TX (US);
Kipchirchir Andrew Boit, Pearland, TX (US); Timothy Wayne Gambrel, Lake Jackson, TX (US)

(73) Assignee: SASOL TECHNOLOGY (PTY) LIMITED, Sandton, Gauteng Province (ZA)

( * ) Notice: Subject to any disclaimer, the term of this patent is extended or adjusted under 35 U.S.C. 154(b) by 0 days.

(21) Appl. No.: 13/992,866

(22) PCT Filed: Nov. 24, 2011

(86) PCT No.: PCT/IB2011/055278
§ 371 (c)(1),
(2), (4) Date: Jun. 10, 2013

(87) PCT Pub. No.: WO2012/080876
PCT Pub. Date: Jun. 21, 2012

(65) Prior Publication Data
US 2013/0269730 A1    Oct. 17, 2013

(30) Foreign Application Priority Data
Dec. 14, 2010 (ZA) .................. 2010/09019

(51) Int. Cl.
*B08B 9/093* (2006.01)
*B01J 4/00* (2006.01)
*B01J 19/18* (2006.01)

(52) U.S. Cl.
CPC .............. *B08B 9/093* (2013.01); *B01J 4/002* (2013.01); *B01J 19/18* (2013.01); *B01J 2219/00779* (2013.01); *B08B 9/0936* (2013.01)

(58) Field of Classification Search
None
See application file for complete search history.

(56) References Cited

U.S. PATENT DOCUMENTS 3,645,452 A * 2/1972 Stoeckel ............... B08B 9/0936
                                                134/168 R
3,842,055 A   10/1974 Balwe et al.
(Continued)

FOREIGN PATENT DOCUMENTS

DE    3700671 A1    7/1988
FR    2320314 A1    3/1977
(Continued)

OTHER PUBLICATIONS

International Search Report and Written Opinion, corresponding International application No. PCT/IB2011/055278, dated Feb. 22, 2012.
(Continued)

*Primary Examiner* — Mikhail Kornakov
*Assistant Examiner* — Ryan L. Coleman
(74) *Attorney, Agent, or Firm* — Marshall, Gerstein & Borun LLP

(57) ABSTRACT

A method of cleaning fouled process equipment which includes a process vessel (10) fouled by an organic foulant, includes spraying a hydrocarbon stream at a pressure of at least 69 bar(g) at fouled surfaces inside the process vessel (10) thereby to dislodge the organic foulant from the fouled surfaces. The hydrocarbon stream is sprayed from at least one nozzle (24) located inside the process vessel (10). The hydrocarbon stream is at a temperature below the melting point of the organic foulant or below the melting point of a major component of the organic foulant when the organic foulant is a multi-component organic foulant. The dislodged foulant is removed from the process vessel (10).

12 Claims, 3 Drawing Sheets

(56) References Cited

U.S. PATENT DOCUMENTS

| | | | | |
|---|---|---|---|---|
| 4,082,057 | A | * | 4/1978 | Hayes ................... B08B 9/0936 118/305 |
| 5,689,028 | A | | 11/1997 | Lashier et al. |
| 6,274,690 | B1 | * | 8/2001 | Hoshida .................. C08F 14/06 526/344 |
| 6,380,451 | B1 | * | 4/2002 | Kreischer .............. B01J 19/002 134/22.14 |
| 6,550,487 | B1 | * | 4/2003 | Duckett .................... A61L 2/22 134/108 |
| 7,291,685 | B2 | * | 11/2007 | Kobayashi ................ C07C 2/30 526/74 |
| 7,524,380 | B1 | * | 4/2009 | Duri .................... A47L 15/0047 134/18 |
| 2009/0235961 | A1 | * | 9/2009 | Geppert ................... B05B 3/06 134/167 R |

FOREIGN PATENT DOCUMENTS

| | | |
|---|---|---|
| GB | 2364235 A | 1/2002 |
| WO | WO-1992/1476 A1 | 9/1992 |

OTHER PUBLICATIONS

International Preliminary Report on Patentability, corresponding International application No. PCT/IB2011/055278, dated Jun. 18, 2013.

Walsh et al., "Tetramerisation Process Technology Review," published on the internet at http://priorart.ip.com/IPCOM/000029794, on Jul. 13, 2004, 27 pages.

* cited by examiner

CLEANING OF PROCESS EQUIPMENT

FIELD OF THE INVENTION

THIS INVENTION relates to the cleaning of process equipment, including process vessels. In particular, the invention relates to a method of cleaning fouled process equipment which includes a fouled process vessel, and to a process vessel adapted for cleaning.

BACKGROUND OF THE INVENTION

Many chemical processes are known which cause fouling of the process equipment in use in these chemical processes. For example, during oligomerisation or polymerization processes product mixtures consisting of olefins, including alpha-olefins, C10+ olefins and polymer including polyethylene may be produced. In the case of a tetramerisation or trimerisation process, for example, ethylene is catalytically converted into a product mixture consisting primarily of 1-octene and 1-hexene. Typically, the product mixture will consist of at least 30% by mass 1-octene and 1-hexene respectively. However, during this reaction, by-products consisting of light ends, C10+ olefins and polyethylene are also formed. Polyethylene is therefore formed as a by-product and although a large percentage of the polyethylene exits the reactor as a slurry with the product mixture, the remaining polyethylene coats the reactor surfaces. This fouling layer builds up over time and eventually the reactor requires cleaning.

In the case of ethylene oligomerisation reactors, the cleaning of the reactors has traditionally been effected by hot washing with a solvent at elevated temperatures. Although highly effective, hot washing has numerous undesirable consequences including thermal stress to the vessel, long cleaning times, complicated agitator design and complicated vessel internals.

Although hydroblasting of a process vessel, such as an oligomerisation reactor, is a simple alternative cleaning method, the use of water is very often undesirable as it may be a poison to any catalyst used in the vessel. In addition, the time taken to open a process vessel for cleaning is often also prohibitive.

SUMMARY OF THE INVENTION

According to one aspect of the invention, there is provided a method of cleaning fouled process equipment which includes a process vessel fouled by an organic foulant, the method including spraying a hydrocarbon stream at a pressure of at least 69 bar(g) at fouled surfaces inside the process vessel thereby to dislodge the organic foulant from said fouled surfaces, the hydrocarbon stream being sprayed from at least one nozzle located inside the process vessel and the hydrocarbon stream being at a temperature below the melting point of the organic foulant or below the melting point of a major component of the organic foulant when the organic foulant is a multi-component organic foulant; and removing the dislodged foulant from the process vessel.

The organic foulant may include aluminium.

The hydrocarbon stream may include, or may be defined by one or more hydrocarbons. The hydrocarbon or hydrocarbons defining the hydrocarbon stream may be compatible with a catalyst of a process employing the process vessel. In other words, if the process vessel is used to process or contain a fluid which includes a catalyst, the hydrocarbon or hydrocarbons of the hydrocarbon stream is/are preferably not a catalyst poison and is/are preferably inert in relation to this catalyst.

The primary cleaning mechanism of the method of the invention is thus the forceful removal by a high pressure hydrocarbon jet or stream of organic foulant from fouled surfaces. There is preferably very little, more preferably no dissolution or chemical cleaning effect when the method of the invention is applied. In other words, preferably the organic foulant and the hydrocarbon(s) used for cleaning do not react to any significant extent at the temperature of the hydrocarbon stream.

Typically, the dislodged foulant is removed from the process vessel with the hydrocarbon used to clean the process vessel.

The method may include displacing said at least one nozzle from a retracted condition in which the nozzle is not present inside, or not exposed to, a process volume defined by the process vessel, to an operative or cleaning condition in which the nozzle is positioned inside or exposed to the process volume defined by the process vessel and capable of being aimed or directed at fouled surfaces, including interior surfaces of the process vessel that are fouled. Preferably, the nozzle is displaced without having mechanically to open the process vessel, i.e. without having to obtain access for personnel to the interior of the process vessel from outside the process vessel.

The hydrocarbon or hydrocarbons defining the hydrocarbon stream may be or may include a hydrocarbon present in the process vessel during normal operation of the process vessel. As will be appreciated, by using a hydrocarbon or hydrocarbons present in the process vessel during normal operation of the process vessel, to define the hydrocarbon stream, processing complexity is reduced and the risk that catalyst poison ingress from an external source will take place is eliminated or at least substantially reduced.

The process vessel may be an oligomerisation or polymerization reactor. In one embodiment of the invention, the process vessel is an ethylene oligomerisation reactor.

When the process vessel is an ethylene oligomerisation reactor, the hydrocarbon stream may include hexene, octene and/or C10 and heavier olefins.

Preferably, the hydrocarbon stream includes, or even consists predominantly of, linear hydrocarbons, e.g. linear alpha-olefins such as 1-hexene or 1-octene, as opposed to C6 and heavier branched hydrocarbons due to the higher diffusion rates and swelling power of molecules of the linear hydrocarbons in downstream processing unit(s).

The hydrocarbon stream may be sprayed at a pressure of at least 345 bar(g). The pressure of the hydrocarbon stream may be in excess of 690 bar(g) or even in excess of 1380 bar(g).

The organic foulant may be, or may include a polymer, e.g. polyethylene. When the organic foulant includes polyethylene, the hydrocarbon stream is at a temperature of less than 105° C., preferably less than 80° C., e.g. between 20° C. and 70° C.

Said at least one nozzle may be displaced from its retracted condition in a compartment or parking space closable or sealable from the process volume defined by the process vessel and the method may thus include opening a path between the compartment or parking space and the process volume and displacing the nozzle along the opened path from its retracted condition to its operative condition, before spraying said hydrocarbon stream from the nozzle. The method may also include, after the spraying of said hydrocarbon stream from the nozzle, displacing the nozzle from its operative condition to its retracted condition along said path, and closing or sealing the compartment or parking space from the process volume. Typically, the compartment or parking space is external of the process volume defined by the process vessel. For example, the nozzle may be displaced from outside the process vessel through a valve isolating the nozzle from the process volume, after the valve has been opened to allow passage of the nozzle.

If desired, the method may include maintaining a pressure in the compartment or parking space that is higher than the normal operating pressure of the process vessel to ensure that material from the process vessel does not ingress into the compartment or parking space.

Said at least one nozzle may be connected to a flexible hose, displacement of the nozzle from its retracted condition to its operative condition or vice versa respectively being by unwinding or winding of the flexible hose. The nozzle may instead be attached to a telescopic lance or deployed via a derrick.

The hydrocarbon stream may additionally be sprayed from at least one fixed nozzle positioned inside the process vessel and aimed at a surface particularly prone to fouling, e.g. an injector or an outlet valve.

According to another aspect of the invention, there is provided a process vessel adapted for cleaning, the process vessel defining a process volume and including at least one displaceable nozzle operable to be displaced between a retracted condition in which the nozzle is not present inside or not exposed to the process volume and an operative or cleaning condition in which the nozzle is positioned inside or exposed to the process volume, the nozzle being connected to a high pressure hydrocarbon stream supply line.

The process vessel may be an oligomerisation or polymerization reactor, e.g. an ethylene oligomerisation reactor.

The process vessel may include at least one reactant inlet and at least one product outlet and may in addition include an agitator. The method of the invention is particularly useful when the process vessel does not include an agitator or a pump around system which is typically used to impart the necessary shear within the vessel during a hot wash.

The process vessel may include at least one stationary or fixed nozzle inside the process volume. The fixed nozzle is typically aimed at a surface inside the process vessel particularly prone to fouling. The fixed nozzle is also connected or connectable to a high pressure hydrocarbon stream supply line.

The high pressure hydrocarbon stream supply line may include a flexible hose or telescopic lance as hereinbefore described. The nozzle may be vertically displaceable inside the process volume defined by the process vessel, to allow cleaning at any level in the vessel.

The process vessel may include a compartment or parking space as hereinbefore described. The compartment or parking space may conveniently be above the process volume defined by the process vessel, e.g. above a lid or upper dome of the process vessel.

The displaceable nozzle is typically rotatable about at least one axis, e.g. a vertical axis or a horizontal axis. Preferably, the displaceable nozzle is rotatable about at least two axes which are angularly spaced relative to each other. Typically, the axes are 90° apart.

Preferably, the displaceable nozzle is rotated by a hydrocarbon stream flowing through the nozzle. In other words, the displaceable nozzle preferably does not include drive means, such as a mechanical or electrical drive, to rotate the nozzle.

BRIEF DESCRIPTION OF THE DRAWING

The invention will now be described, by way of non-limiting example, with reference to the accompanying diagrammatic drawings in which.

DETAILED DESCRIPTION OF THE INVENTION

Figure 1:
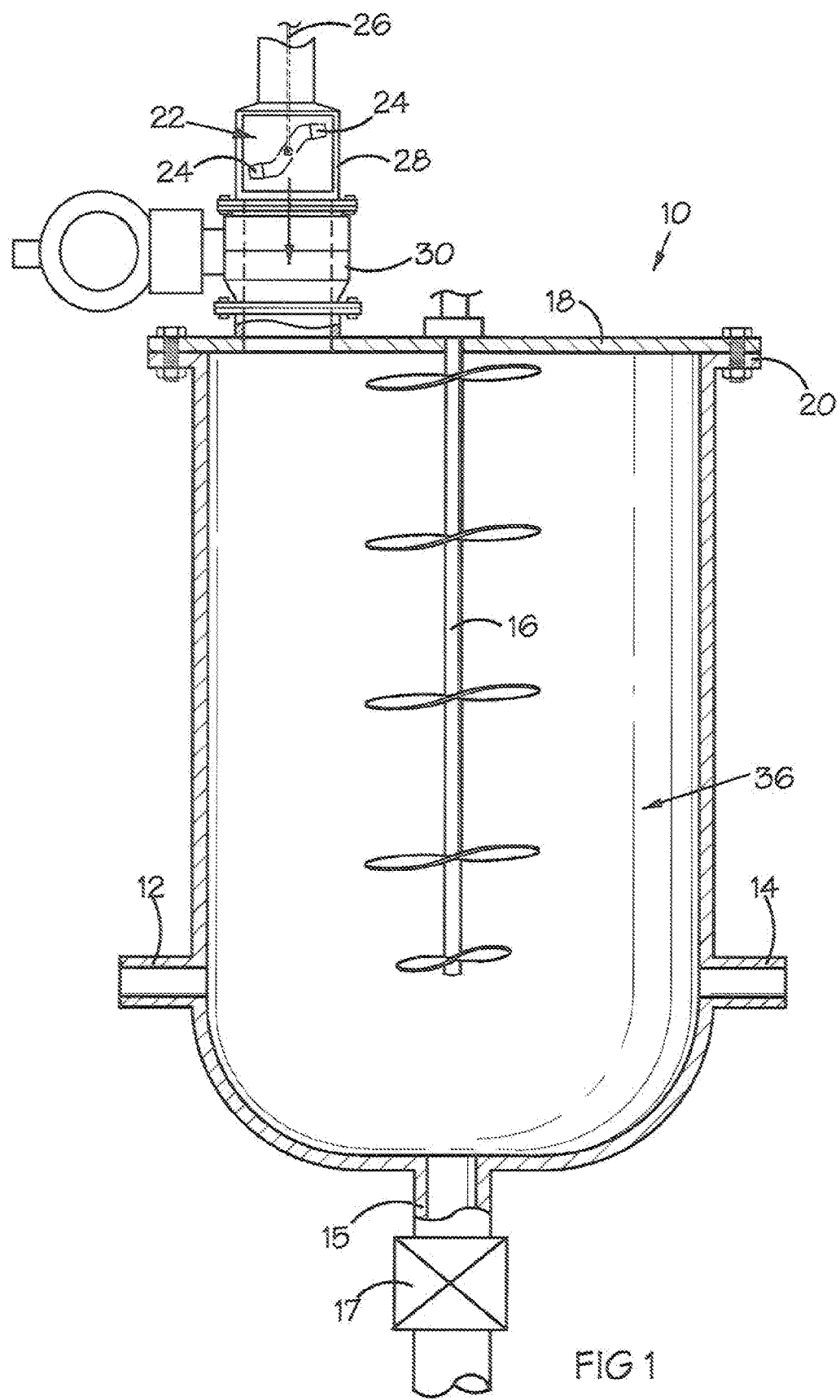
FIG. 1 shows a partially vertically sectioned view of a process vessel in accordance with the invention adapted for cleaning, prior to cleaning of the vessel.

Referring to the drawings, reference numeral 10 generally indicates a process vessel, in the form of an ethylene oligomerisation reactor, in accordance with the invention. The vessel 10 includes an ethylene inlet 12, a product mixture outlet 14, an agitator 16, and a drain 15 with a drain valve 17. A lid 18 is bolted to a flange 20 to close the vessel 10.

The vessel 10 further includes a cleaning head 22 comprising, in the embodiment shown, two nozzles 24 aimed in opposite directions. The cleaning head 22 is a conventional tank cleaning head which is rotatable about a vertical axis, with the nozzles 24 being rotatable about a horizontal axis. In use, the cleaning head 22, and the nozzles 24, are driven to rotate by high pressure fluid (liquid hydrocarbon) flowing through the cleaning head 22 and the nozzles 24.

The cleaning head 22 is suspended from a flexible hose 26. Typically, the hose 26 is wound in the form of a hose reel 27 operated by an electric motor (not shown).

The vessel 10 includes a compartment 28 attached to the lid 18 by a valve 30 (typically a high pressure full port ball valve or a gate valve) which provides access through the lid 18. The compartment 28 houses the cleaning head when the vessel 10 is not being cleaned.

When desired to expose the cleaning head 22 to an interior space or process volume 36 defined by the vessel 10, the valve 30 is opened to allow the cleaning head 22 to enter the process volume 36.

In the embodiment illustrated in the drawings (cleaning of a CSTR with an agitator), more than one compartment 28 and cleaning head 22 may be used to prevent 'shadowing' in the vessel 10. Shadowing is a phenomenon known to those skilled in the art and is caused by the agitator 16 or some other obstruction within the vessel 10 preventing high pressure jets from striking the entire interior surface of the vessel 10.

If necessary or desired, and if the compartment 28 is a closed vessel or container, pressurising means may be provided to pressurize the compartment 28, when the valve 30 is closed, with a fluid to ensure that the compartment 28 is at a higher pressure than the process volume 36. As will be appreciated, the compartment 28 may alternatively be pressurized by means of the hose 26 and the nozzles 24.

The vessel 10 is used in conventional fashion to oligomerise ethylene to produce primarily 1-octene and 1-hexene. During the oligomerisation reaction, polyethylene is formed as a by-product and some of the polyethylene coats interior surfaces of the vessel 10, as well as the agitator 16. A fouling layer of polymer builds up over time and eventually the vessel 10 and/or the agitator 16 requires cleaning.

Figure 2:
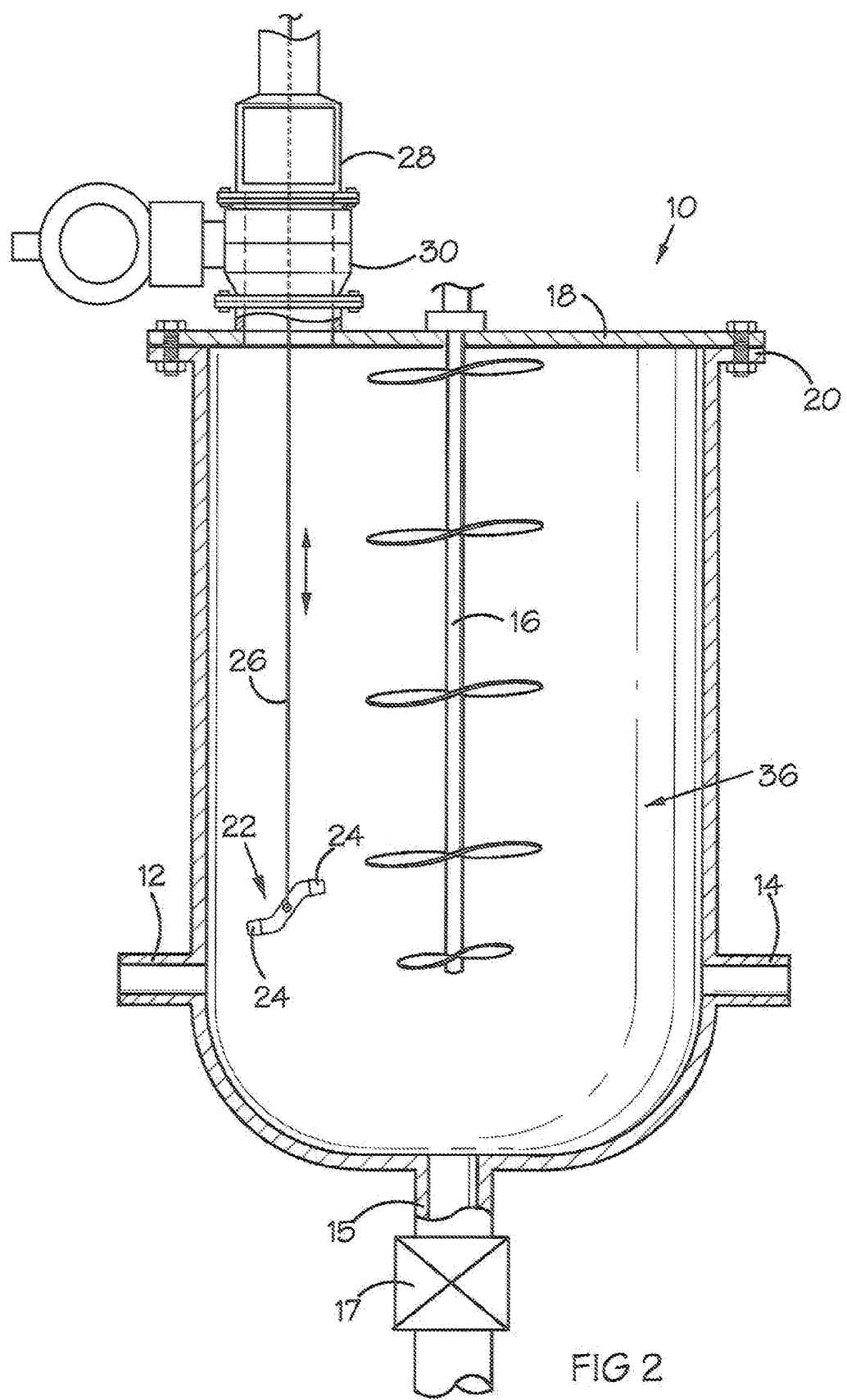
FIG. 2 shows the vessel of FIG. 1 ready for cleaning.
Figure 3:
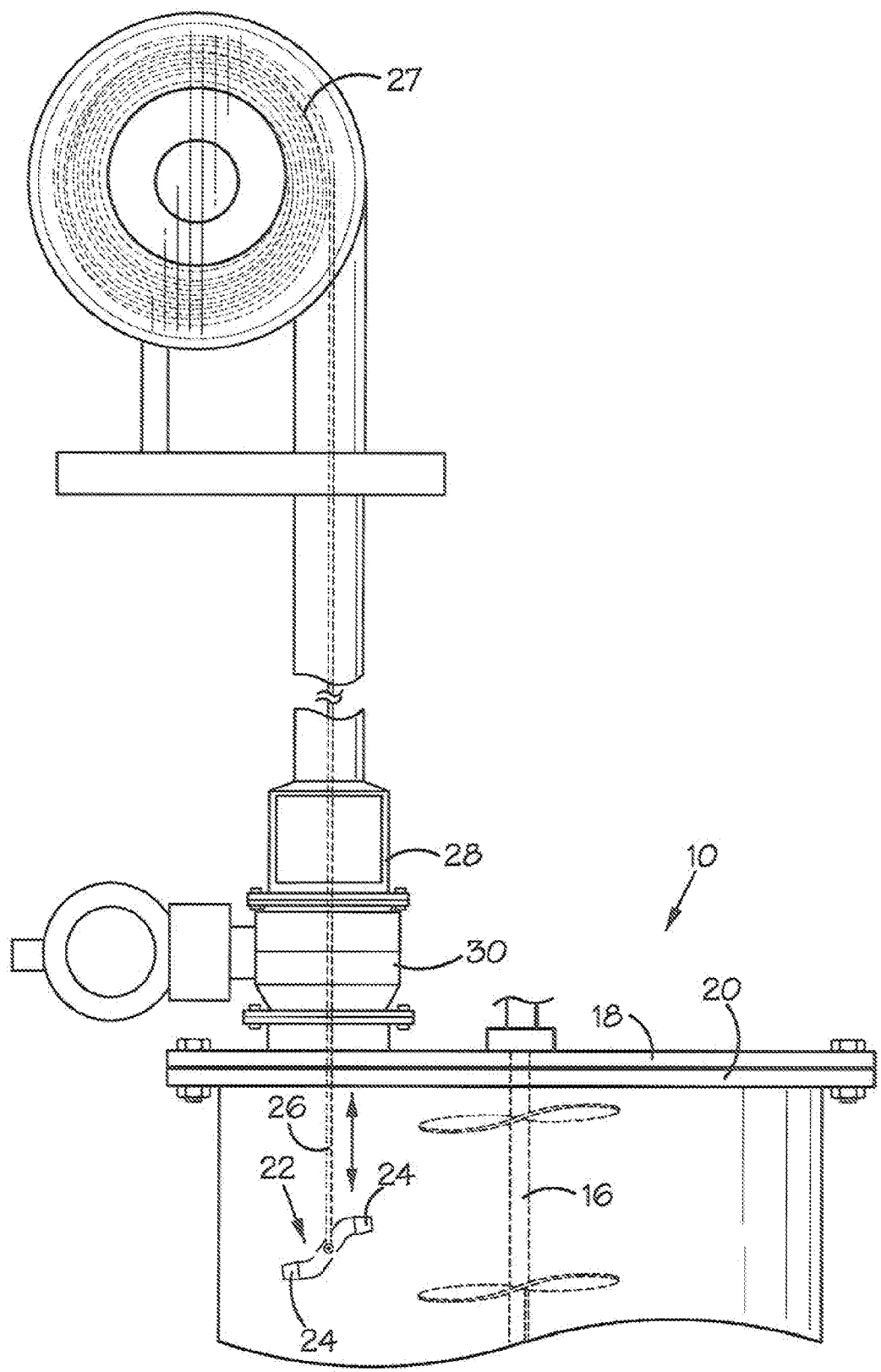
FIG. 3 shows more detail of cleaning equipment of the vessel of FIG. 1.

In order to clean the vessel 10, the vessel 10 is drained (e.g. using the drain 15 and the drain valve 17) and the valve 30 is opened allowing the cleaning head 22 entry into the vessel 10 as shown in FIG. 2. The flexible hose 26 is thus unwound from the hose reel 27 so that the cleaning head 22 drops from the compartment 28 through the valve 30 and is located inside the process volume 36. A hydrocarbon stream of 1-octene, at a pressure of 550 bar(g), is sprayed through the flexible hose 26 and the nozzles 24 of the cleaning head 22, in order to clean the vessel 10. With the cleaning head 22 rotating about a vertical axis, and the nozzles 24 rotating about a horizontal axis, a 360° cleaning pattern over the entire interior surface of the vessel 10 is obtained. As mentioned previously, 'shadowing' can effectively be eliminated by using more than one cleaning head 22 within the vessel 10. The exact number and placement of the cleaning heads 22 are dictated by the vessel internals. Optimum results can be obtained when no internals exist, e.g. in the case of a bubble column where the use of only one compartment 28 and cleaning head 22 is necessary in the centre of the vessel 10. By raising and lowering the cleaning head 22, by means of the flexible hose 26, it is possible to clean the entire interior surface of the vessel 10, including the agitator 16. Dislodged polymer and the 1-octene used to dislodge the polymer are removed from the vessel 10, through the drain 15.

Once the cleaning of the vessel 10 has been completed, the flexible hose 26 is wound sufficiently around the hose reel 27 to retract the cleaning head 22 into the compartment 28, and the valve 30 is closed. During retraction of the cleaning head 22, the nozzles 24 are flushed with the 1-octene stream to ensure that they are clean when they enter the compartment 28.

Typically, a programmable logic controller (PLC) is used to control the entire cleaning operation, and possibly also the oligomerisation reactor or vessel 10. The PLC (not shown) can thus be programmed with several types of fully automated cleaning programmes and will typically be programmed to open and close valves, such as the drain valve 17, the access valve 30 and a valve controlling the flow of the 1-octene, start pumps, such as a pump for providing the 1-octene stream at high pressure, raising and lowering the cleaning head 22 by means of the flexible hose 26, and the like. The PLC can also be programmed to ready the vessel 10 for start-up.

In order to test the cleaning method of the invention, an ethylene tetramerisation reactor similar to the vessel 10 was used. The reactor was fouled with polyethylene. The agitator was removed and a nozzle was positioned in the centre of the reactor. The nozzle was configured to rotate about the vertical axis and was moved slightly down the reactor for each experimental run. The experimental runs were conducted with water to show that high pressure is required to clean interior surfaces of the reactor, but it is however to be borne in mind that water should not be used for reactors employing a catalyst for which water is a poison, such as an ethylene oligomerisation catalyst.

The following table sets out the experimental results for three runs at different water pressures and flow rates and as can be seen, it was possible to remove the polymer from fouled surfaces.

| Experiment | Ring | Duration | Nozzle (mm) | Pressure bar(g) | Flow rate (l/s) | Result |
|---|---|---|---|---|---|---|
| 1a | 1 | 15 s | 1.6 | 69 | 0.22 | Slight impact into softer polymer |
| 1b | 1 | 30 s | 1.6 | 345 | 0.49 | Almost ¾ of the polymer removed |
| 1c | 1 | 30 s | 1.6 | 690 | 0.7 | Polymer removed. Clean metal visible. |

In order further to test and to compare the removal efficiencies of water and a hydrocarbon, a further experiment was conducted. A 5 mm PVC-U plate was used as a model compound to investigate the removal efficiency of a high pressure jet of water versus a hydrocarbon jet at a similar pressure. Diesel was used as a suitable model fluid for the hydrocarbon stream. The PVC-U plate was positioned in a blast chamber fitted with a robotic arm. A high pressure cleaning nozzle was attached to the end of the robotic arm. The robotic arm was programmed to move across the PVC-U plate at a speed of 50 mm/s whilst continuously increasing the stand-off distance between the nozzle and the PVC-U plate from an initial distance of 25 mm to a final distance of 500 mm. Two separate sweeps were carried out along the length of the same PVC-U plate, the first used water as the blasting fluid, whilst the second used diesel. A pressure of 700 bar(g) was used with a 1 mm nozzle, yielding a volumetric flow rate of 0.27 l/s. The removal depth (i.e. the depth of the cut into the PVC-U plate) was then measured as a function of the stand-off distance between the nozzle and the PVC-U plate for the two different fluids. Due to the lower density of diesel, the mass flow rate of diesel was approximately 83% of that of water. Since the cleaning force of the fluid was based on units of mass and not volume, it was expected that the diesel would perform slightly poorer than water.

The water and diesel removed a similar amount of material across the range of stand-off distances tested. Water proved to be better up to distance of 300 mm, whilst, surprisingly, diesel showed some improvement at distances greater than 300 mm, where the optimal efficiency was reached. Larger stand-off distances are typical in real applications where the cleaning nozzle needs to move freely within the process volume being cleaned. Thus, based on the data, diesel (or possibly other suitable hydrocarbons) was established to be a suitable alternative to water as a high pressure cleaning fluid.

Using the cleaning method of the invention, or a process vessel adapted for cleaning in accordance with the invention, it is possible to clean a fouled reaction vessel without opening the vessel to provide access to personnel and without running the risk of allowing a catalyst poison to enter the vessel. When the foulant is a polymer, the method of the invention ensures that the polymer does not dissolve significantly in the hydrocarbon stream used for cleaning as the temperature of the hydrocarbon is below the melting point of the polymer. This prevents dissolution of the polymer in the hydrocarbon thereby allowing for minimal increase in the viscosity of effluent from the vessel being cleaned. As will be appreciated, higher viscosities would lead to slower drainage of the vessel during cleaning thereby impeding effective washing of the lower portions of the vessel and increasing the time required for cleaning of the vessel. Importantly also, walls of the vessel are not exposed to thermal stress as would be the case when a hot wash is used to clean the vessel. The high pressure used in the cleaning method of the invention provides the shear required to dislodge an organic foulant such as a polymer from fouled surfaces. The combination of the hydrocarbon cold wash and the high pressure employed ensures that the vessel is cleaned efficiently without posing any dangers to the processes normally conducted within the vessel.

The invention claimed is:

1. A method of cleaning process equipment which includes a process vessel fouled by an organic foulant from a chemical process that involves oligomerisation and polymerization in the presence of a catalyst, the method including
spraying a liquid hydrocarbon stream, which is not a catalyst poison for said catalyst of said process, at a pressure of at least 69 bar(g) at fouled surfaces inside the process vessel to forcefully dislodge the organic foulant from said fouled surfaces by means of shear provided by the high pressure hydrocarbon stream, the hydrocarbon stream being sprayed from at least one nozzle located inside the process vessel and the hydrocarbon stream being at a temperature below the melting point of the organic foulant or below the melting point of an organic component of the organic foulant when the organic foulant is a multi-component organic foulant to minimize dissolution of the organic foulant in the hydrocarbon stream; and
removing the dislodged foulant from the process vessel.

2. The method as claimed in claim 1, in which the foulant includes aluminium.

3. The method as claimed in claim 1, which includes displacing said at least one nozzle from a retracted condition in which the nozzle is not present inside, or not exposed to, a process volume defined by the process vessel, to an operative or cleaning condition in which the nozzle is positioned inside or exposed to the process volume defined by the process vessel and capable of being aimed or directed at fouled surfaces, including interior surfaces of the process vessel that are fouled.

4. The method as claimed in claim 1, in which the hydrocarbon stream includes, or is defined by one or more hydrocarbons that are present in the process vessel during operation of the process vessel.

5. The method as claimed in claim 1, in which the process vessel is an oligomerisation or polymerization reactor.

6. The method as claimed in claim 5, in which the process vessel is an ethylene oligomerisation reactor, and in which the hydrocarbon stream includes C10+ hydrocarbons.

7. The method as claimed in claim 5, in which the process vessel is an ethylene oligomerisation reactor, and in which the hydrocarbon stream includes linear hydrocarbons.

8. The method as claimed in claim 1, in which the organic foulant is or includes polyethylene and in which the hydrocarbon stream is at a temperature of less than 105° C.

9. The method as claimed in claim 1, in which said at least one nozzle is displaced from a retracted condition in a compartment or parking space closable or sealable from the process volume defined by the process vessel, the method including opening a path between the compartment or parking space and the process volume and displacing the nozzle along the opened path from the retracted condition to an operative condition, before spraying said hydrocarbon stream from the nozzle.

10. The method of claim 1 that comprises spraying the hydrocarbon stream at a pressure of at least 345 bar(g) to dislodge the organic foulant.

11. The method of claim 1 that comprises spraying the hydrocarbon stream at a pressure of at least 690 bar(g) to dislodge the organic foulant.

12. The method as claimed in claim 5, in which the hydrocarbon steam consists essentially of linear hydrocarbons.

* * * * *

UNITED STATES PATENT AND TRADEMARK OFFICE
CERTIFICATE OF CORRECTION

PATENT NO. : 10,589,324 B2
APPLICATION NO. : 13/992866
DATED : March 17, 2020
INVENTOR(S) : Craig McGregor et al.

Page 1 of 1

It is certified that error appears in the above-identified patent and that said Letters Patent is hereby corrected as shown below:

In the Claims

At Column 7, Line 9, "and" should be -- or --.

At Column 8, Line 33, "steam" should be -- stream --.

Signed and Sealed this
Eighth Day of December, 2020

Andrei Iancu
*Director of the United States Patent and Trademark Office*